United States Patent [19]
Finley et al.

[11] 3,794,746
[45] Feb. 26, 1974

[54] METHOD FOR OBTAINING CLEAN MEAT OF NATURAL COLOR FROM WHOLE CLAMS

[75] Inventors: Ronald K. Finley, Towson; Donald J. Langlois, Pasadena, both of Md.; Robert H. Nicholson; Herschel F. Porter, both of Lewes, Del.

[73] Assignee: Doxsee Food Corporation, Baltimore, Md.

[22] Filed: Aug. 21, 1972

[21] Appl. No.: 282,017

[52] U.S. Cl. .................. 426/479, 426/478
[51] Int. Cl. ............................. A22c 25/00
[58] Field of Search ....... 99/111, 112, 233.1, 233.2, 99/233.3, 233.4, 233.5, 233.6, 233.7, 233.8, 233.9, 233.11, 233.12

[56] References Cited
UNITED STATES PATENTS
3,659,315  5/1972  Finley et al. .................. 426/479
3,471,300  10/1969  Wendt ........................ 99/111

*Primary Examiner*—A. Louis Monacell
*Assistant Examiner*—R. A. Yoncoskie
*Attorney, Agent, or Firm*—Roylance, Abrams, Berdo & Kaul

[57] ABSTRACT

Clean clam meat in subdivided form and having its natural color is obtained by physically working shucked whole uneviscerated clams, in the presence of at least enough aqueous liquid to render the clams pumpable, in order to rupture the belly membrane, maintaining the clams suspended in an aqueous liquid at at least 100° F. for 4–45 minutes to cause the entire belly material to be dissolved and dispersed in the liquid, and recovering, promptly washing and subdividing the debellied clams.

6 Claims, 2 Drawing Figures

METHOD FOR OBTAINING CLEAN MEAT OF NATURAL COLOR FROM WHOLE CLAMS

BACKGROUND

This invention relates to the production of clean, edible clam meat from whole clams which have been shucked but not eviscerated.

Though millions of pounds of clam meat are produced each year, substantially all commercial production requires that the visceral material, i.e., the "belly" and contents, be removed manually, as by slitting the peritoneum and washing away the contents with water jets (U.S. Pat. No. 3,471,300, issued Oct. 7, 1969, to A. S. Wendt), or simply by manually tearing away the belly. Such procedures are too tedius, time consuming and costly to be acceptable under present economic conditions, and various proposals have been made to eliminate the manual de-bellying step, including, for instance, the use of enzymes to cause or aid in the separation of the visceral material from the edible meat, but such proposals have not gained commercial acceptance.

U.S. Pat. No. 3,659,315, issued May 2, 1972, to Ronald K. Finley et al. describes a method for obtaining clam meat by first cutting the whole shucked clams into pieces and then agitating the clam pieces in an aqueous medium at 100°–150° F. for at least 5 minutes to cause the visceral material to be taken up by the aqueous medium, the clam pieces then being recovered from the aqueous medium and washed free of any residual liquid. That method has proved very successful and, since it eliminates the use of enzymes or other de-bellying additives, has offered a considerable advantage. Under some conditions of commercial practice, however, that method has proved to have one disadvantage, i.e., the cutting of the clams creates exposed tissue surfaces which are absorptive and tend, therefore, to take up small quantities of the aqueous medium into which the belly material has been dissolved and dispersed, the end result being that these surfaces are discolored by the small quantities of belly material. While mere presence of a small absorbed quantity of belly material is not in itself deleterious, particularly when the clam meat is to be distributed in the form of products such as chowder, the discoloration caused thereby has proved to be a significant practical drawback.

OBJECTS OF THE INVENTION

A general object is to devise a commercially feasible method for obtaining clean edible clam meat from whole clams without requiring manual de-bellying.

Another object is to provide such a process wherein the clam meat need not be cut until after the belly material has been removed.

A further object is to provide a method for de-bellying clams, without manual de-bellying operations, which yields clam meat retaining its natural color.

SUMMARY OF THE INVENTION

The invention is based on the discovery that, if whole uneviscerated clams, combined with at least enough aqueous liquid to render the clams pumpable, are subjected to physical working to rupture the visceral membrane or belly sack and are then maintained suspended in aqueous liquid under controlled conditions of temperature and time, the entire belly material of the clams will be dissolved and dispersed in the aqueous liquid and the clams can be recovered from the liquid, all without exposing to the liquid any tissue surface which will absorb the liquid and be discolored thereby. The recovered eviscerated clams can then be washed promptly with fresh water to remove residual liquid and belly material, and then subdivided, as by slicing, dicing or grinding. While the precise reasons for success of the method are as yet not completely determined, it seems evident that the assumptions of prior-art workers that the viscera could only be removed by methods based on a relatively drastic treatment, such as with enzymes or by initially cutting to render the viscera more easily removed, have simply been in error.

Considered generally, the method can be carried out by subjecting the clams to physical working with any suitable equipment, the step of maintaining the clams suspended in aqueous liquid then being adequate to remove the belly material because suspension requires enough movement of the clams relative to the liquid to assure adequate liquid-solids contact. The whole uneviscerated clams are advantageously pumped into a vessel and there combined with the aqueous liquid, and a propeller agitator employed to accomplish both physical working and suspension. Alternatively, the clams can be first physically worked, in the presence of just enough liquid (typically 3–12 percent by weight) to render the clams pumpable, by passing the clams through a plurality of lobe type positive displacement pumps in series, the clams, with visceral membranes now ruptured, then being combined with further aqueous liquid and maintained suspended therein to dissolve and disperse the belly material.

The step of maintaining the clams suspended is carried out with a quantity of water adequate to provide a water-to-clams weight ratio of at least 1:1, with the initial temperature of the suspension, after the aqueous liquid and clams have been combined, being at least 100°F. but below the boiling point of the aqueous medium. The time period for maintaining the clams in suspension is maintained in the range of 4–45 minutes, after which the clams are recovered from the liquid as whole eviscerated clams. The recovered clams are washed to free them of any residual aqueous medium and can then be subdivided by slicing, dicing or grinding, and the pieces of clam meat can then be given a final washing. Since no cut tissue is exposed until after the belly and contents have been dissolved and dispersed in the aqueous medium and the whole clams then recovered and freed of any surface residue of aqueous medium, there is no opportunity for discoloration by absorption of visceral material and, in the finished product, the clam meat retains its natural color.

In order that the manner in which the method is carried out can be understood in detail, particularly advantageous embodiments thereof will be described with reference to the accompanying drawings, which form part of the original disclosure of this application, and wherein FIGS. 1 and 2 are flow diagrams illustrating different embodiments of the method.

DETAILED DESCRIPTION OF THE METHOD

Figure 1:
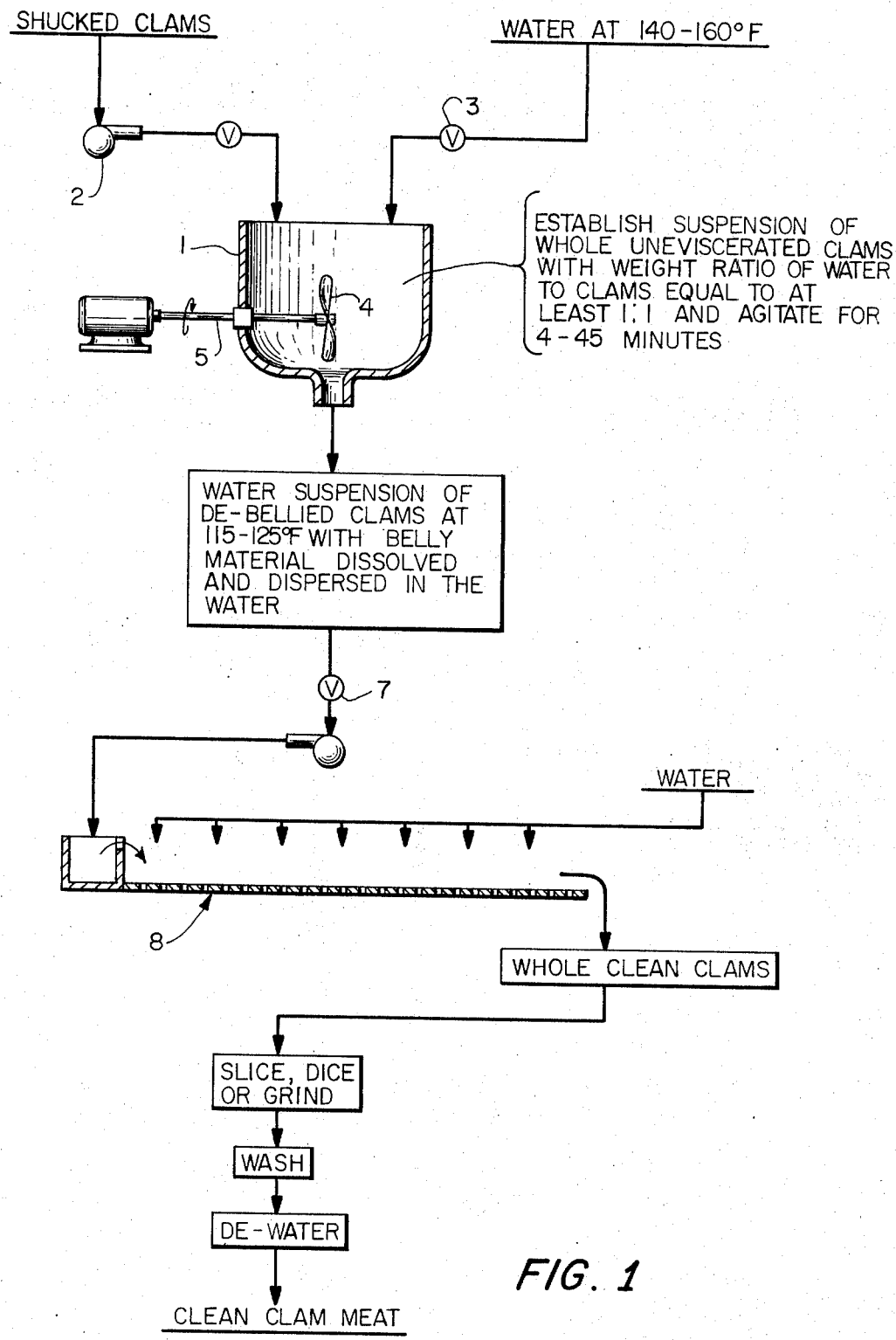

As illustrated in FIG. 1, the method can be carried out by separately delivering the shucked whole clams, typically with about 5 percent by weight of fresh water remaining from the shucking operation, and the aqueous medium, typically water, to a vessel 1 defining a confined treatment zone. The clams can be delivered by means of a positive displacement, lobe type pump 2, and the water can be delivered, under control of a valve 3, from a suitable heat exchanger (not shown).

The aqueous medium and clams are supplied in proportions such as to provide a weight ratio of aqueous medium to clams equal to at least 1.0, with especially good results being achieved when this weight ratio is in the range of 2.0–3.0.

It is particularly important that the initial temperature of the aqueous medium be such that, when the agitation step which follows introduction of the aqueous medium and clams to the vessel 1 has been completed and the suspension is discharged for recovery of the clams, the temperature of the suspension will be at least 100° F. and advantageously in the range of 115°–125° F., with a temperature of about 120° F. being optimum. This can be accomplished by having the initial temperature of the aqueous medium, i.e., its temperature at time of delivery to vessel 1, in the range of 140°–160° F. While higher initial temperatures can be tolerated, so long as the temperature does not exceed the boiling point, temperatures above 160° F. are ordinarily not required and are less economical.

Vessel 1 is equipped with a rotary agitator, typically a 3-bladed propeller 4 fixed to a horizontal shaft 5 driven by a motor 6. The agitator is of such configuration as to accomplish positive agitation of the suspension without cutting the clams. The agitator is driven at a rate adequate to cause the suspension to be stirred forcibly and continuously, with the whole clams being positively engaged by the agitator and directed through a path carrying them into contact with the inner wall surfaces of the vessel. While this action on the clams can be aptly termed forcible, it is carried out in such fashion and with such energy that the edible meat of the clams is not cut, torn or otherwise disrupted. Considering quantities of suspension suitable for carrying out the method on a commercial scale, the agitation can be provided by a propeller agitator driven at 250–400 r.p.m.

The necessary duration of the agitation step depends upon the temperature of the suspension, being shorter when the temperature is higher and longer when the temperature is lower. In general, with the temperature of the suspension at at least 100° F. when the agitating step is completed, the time period of agitation should be 4–45 minutes. With the suspension at a temperature at or near 120° F. when discharged from the vessel 1, an agitation period of about 6 minutes is optimum.

Agitation of the suspension under these conditions causes the visceral material to be completely removed from the clams, with the clams remaining otherwise whole, and with all of the visceral material being dissolved and dispersed in the aqueous medium.

Accordingly, the aqueous suspension can be removed from vessel 1 at the end of the agitation period, as by pump 7, and delivered to a conventional shaker screen 8, with the whole, now-debellied clams travelling over the screen and with the aqueous medium being delivered separately as a by-product or to waste. While on shaker screen 8, the clams are washed by overhead water sprays or showers, as illustrated diagrammatically. Accordingly, whole clean clams, essentially completely free of all visceral material, are discharged from the shaker screen.

The clams can be used in whole condition, or can be delivered to a conventional subdividing apparatus, e.g., a slicer, dicer, or grinder, the resulting clean clam pieces then being given a final washing, as in a flume washer, and then being de-watered to provide a product consisting of clean, viscera-free pieces all surfaces of which retain their original natural color.

Figure 2:
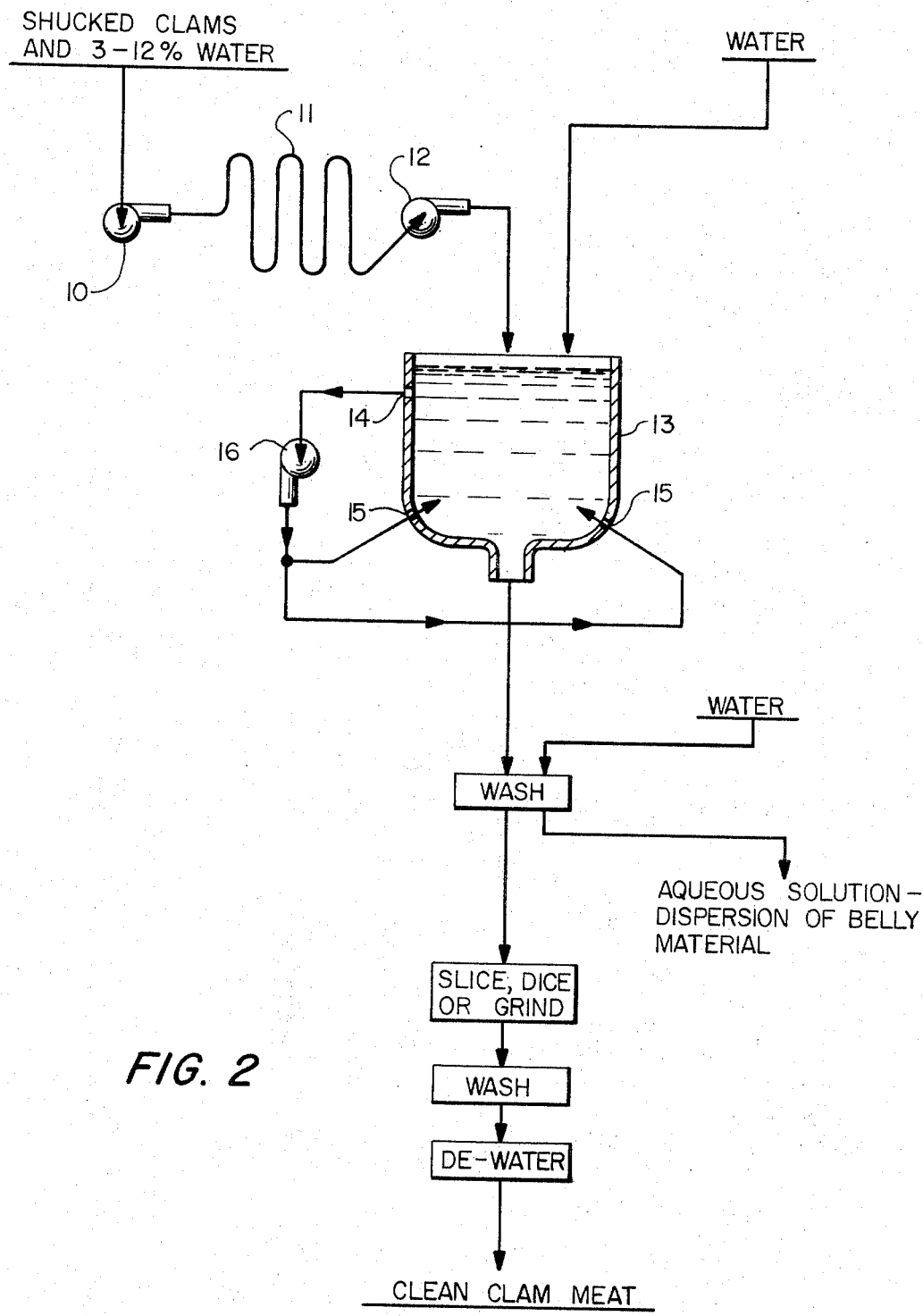

When carrying out the method in accordance with FIG. 1, the propeller agitator is employed both to physically work the clams clams, in order to disrupt the visceral membrane, and to maintain the clam suspended in the liquid, in order to dissolve and disperse the belly material. Alternatively, as illustrated in FIG. 2, the physical working step can be carried out as a preliminary to introduction of the clams into the confined zone where dissolving and dispersing of the belly material is to be accomplished.

Here, the whole shucked but uneviscerated clams and water equal to 3–12 percent of the weight of the clams pass through a first positive displacement pump 10, thence through a conduit 11 defining a tortuous flow path, and thence through a second positive displacement pump 12, after which the clams and water are discharged into a suitable vessel 13. Pumps 10 and 12 are of the intermeshing lobe type and serve not only to convey the clams and liquid but also to subject the clams to physical working, in squeezing and rolling modes, to rupture the visceral membranes or belly sacks, that physical working being supplemented by the forcible rolling and compression action occurring as the clams are passed through the tortuous path defined by the conduit 11.

Water is charged to vessel 13 to bring the total amount of water above that necessary to provide a water-to-clams weight ratio of 1:1. Vessel 13 is provided with a screen-equipped recycle outlet 14 and inlets 15 located near the bottom of the vessel, the inlets 15 being equipped with discharge nozzles (not shown) oriented to direct the recycled water upwardly and across the vessel. A pump 16 is connected between outlet 14 and inlets 15, as shown, and is operated continuously at a flow rate adequate to keep the liquid in the vessel in constant motion so as to keep the clams suspended. The water introduced into vessel 13 is at a temperature such that the suspension will be at at least 100° F., advantageously 115°–125° F.

Depending upon the parameters of the physical working equipment comprising pumps 10, 12 and conduit 11, the residence time of the clams in the physical working equipment can be 0.5–2 minutes and the residence time of the suspension in vessel 13 can then be 4–45 minutes. At the end of that time, the suspension is removed from the vessel, the clams separated from the liquid and washed, and the clean clams subdivided, washed and de-watered as described with reference to FIG. 1.

The following examples are illustrative of the invention:

EXAMPLE 1

Following the flow diagram of FIG. 1 and employing a 300-gallon kettle equipped with a 3-blade, 12 inch propeller agitator, 900 lbs. of shucked, whole, uneviscerated surf clams, containing 5 percent by weight residual fresh water from the shucking operation, were pumped into the empty kettle promptly after shucking and without preliminary treatment other than shucking. When all of the clams had been delivered to the kettle, 2,000 lbs. of fresh water which had been preheated to 160° F. was delivered into the kettle over a period of 3 minutes, providing a suspension of clams in water with a weight ratio of water to clams of 2.4. Agitation was then started, with the propeller agitator rotating at 350 r.p.m., and continued for 6 minutes. At the end of that time, the entire contents of the kettle was pumped out and delivered to a shaker screen equipped with an overhead washing assembly arranged to deliver a washing shower of fresh water at ambient temperature. As delivered from the shaker screen, the clams remained in whole condition save for being now essentially completely free of visceral material. The temperature of the suspension pumped from the kettle was 120° F. The liquid of the suspension was observed to contain the belly material in solution and suspension. Though the belly material was clearly observable in the liquid of the suspension in the kettle, causing the liquid to be opaque, gray-green and somewhat mucilaginous, with observable small particles and fragments, no visible residue of this liquid or its dissolved and suspended content remained on the clams as delivered from the shaker screen.

The clean, whole, eviscerated clams discharged from the shaker screen were delivered to a conventional grinder, the ground to clam pieces having a maximum dimension in the range of ½ – ¾ inch, and the clam pieces were washed with fresh water at ambient temperature in a flume washer, then dewatered conventionally and passed over an inspection screen. The pieces were inspected for color and it was found that the exposed surfaces of the pieces, including the cut surfaces, were of normal color, exhibiting no off-color from absorbed visceral material.

EXAMPLE 2

The procedure of Example 1 is repeated, but with different water input temperatures, agitation time periods, and suspension outflow temperatures, as follows:

| Run | Water Input Temp., °F. | Agitation Time, Mins. | Suspension Out-Flow Temp., °F. |
|---|---|---|---|
| 1 | 140 | 8 | 110 |
| 2 | 150 | 6.5 | 118 |
| 3 | 180 | 5 | 123 |

In each run, the visceral material is taken up completely by the water and the product is discharged from the shaker screen as whole, clean, eviscerated clams.

EXAMPLE 3

To demonstrate the criticality of the agitation step, four whole, shucked, uneviscerated surf clams were placed in a beaker containing an amount of water equal to 2.3 times the weight of the clams, the water having been pre-heated to 160° F. The beaker was allowed to stand without agitation for 10 minutes. Save for removal of superficial surface material, the clams were found to be essentially unchanged at the end of the 10-minute period, the viscera remaining intact.

What is claimed is:

1. The method for producing clean, edible clam meat, retaining essentially its natural color, from shucked but uneviscerated clams, comprising subjecting the whole uneviscerated clams to physical working, in the presence of at least enough aqueous liquid to render the clams pumpable, and thereby rupturing the belly membrane without disrupting edible tissue;

maintaining the clams suspended in an aqueous liquid, in quantity such as to provide a weight ratio of liquid to clams of at least 1:1, for a period of 4–45 minutes at a temperature of at least 100° F. but below the boiling point of the aqueous liquid, whereby the entire belly material of the clams is dissolved and dispersed in the aqueous liquid;

recovering the debellied clams from the aqueous liquid; and promptly washing the debellied clams to free the same from residual aqueous liquid and belly material.

2. The method according to claim 1, wherein
said step of physical working and said step of maintaining the clams suspended are carried out in the same body of aqueous liquid, said body of liquid being subjected to positive agitation to accomplish both mechanical working and suspension of the clams.

3. The method according to claim 1 and further comprising
subdividing the recovered clams after said washing step.

4. The method according to claim 1, wherein
the uneviscerated whole clams are combined with the aqueous liquid and said steps of physical working and maintaining the clams suspended are accomplished by positive agitation of the liquid, the weight ratio of aqueous liquid to clams being at least 2:1, and the temperature of the aqueous liquid being at least 110° F.

5. The method according to claim 4, wherein
the uneviscerated whole clams are first pumped into a confined treatment zone;

the aqueous liquid is then delivered to said confined treatment zone at a temperature of 140°–160° F. in an amount to provide a weight ratio of aqueous liquid to clams in the range of 1.75–3.0 and said step of positive agitation is carried out for 5–7 minutes; and the suspension is then removed from the confined treatment zone at a temperature of 115°–125° F.

6. The method according to claim 5, wherein
said step of positive agitation is accomplished by subjecting the aqueous liquid and clams to the action of a propeller agitator rotating about an axis transverse to the vertical axis of the confined zone.

* * * * *